Nov. 8, 1960
J. LECLABART
2,959,167
MASSAGE APPLIANCE
Filed April 27, 1959
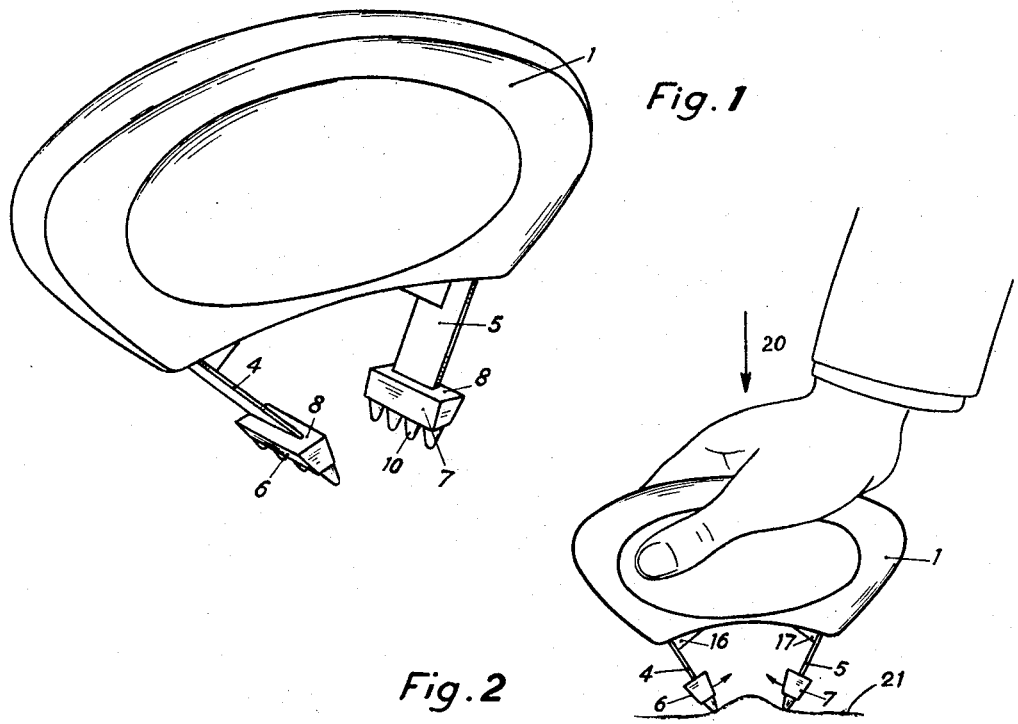
Fig. 1
Fig. 2
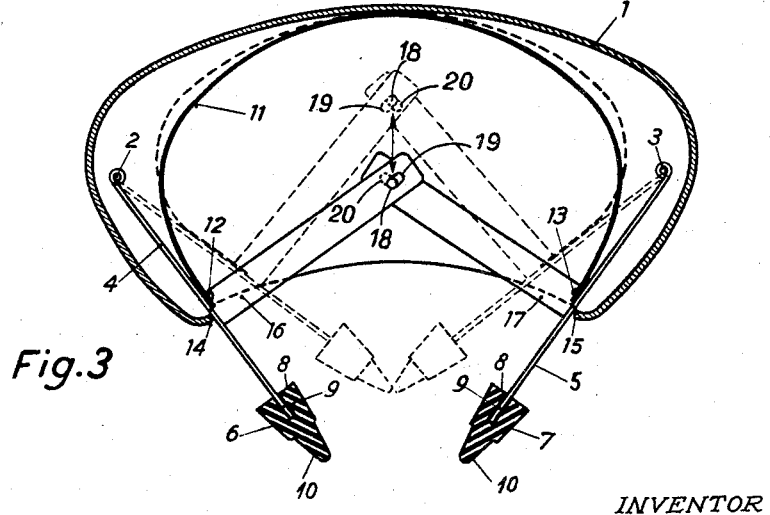
Fig. 3
INVENTOR
JEAN LECLABART
BY Cameron, Kerkam & Sutton
ATTORNEYS

United States Patent Office 2,959,167
Patented Nov. 8, 1960

2,959,167

MASSAGE APPLIANCE

Jean Leclabart, 53 Avenue Raymond Poincare, Paris, France

Filed Apr. 27, 1959, Ser. No. 809,173

Claims priority, application France Feb. 11, 1959

4 Claims. (Cl. 128—59)

The invention relates to a massage appliance which may be used especially for massaging the scalp and combating loss of hair.

The scalp, especially that part which is situated at the top of the skull, is subjected to a pull which stretches it and causes it to bear tightly against the skull-case, reducing the blood circulation which is essential to the existence of the hair.

Massage, which is generally carried out by hand, involves the disadvantage of being difficult to do without external assistance and of not sufficiently loosening the scalp from the skull-case. Hand massage which is badly carried out may, on the contrary, be injurious.

The recommended method of combating loss of hair is to raise the cuticle towards the top of the skull-cap, while tending to loosen the said cuticle in order to allow an inflow of blood.

The invention relates to an appliance which carries out both massage and a pinching action on the cuticle, thus loosening the latter in precisely defined places.

According to the invention, the appliance comprises a casing, two arms whereof each terminates at one end in a friction member and is mounted in oscillatory fashion on a pivot pin carried by the casing, the pivot pins being parallel, and the two arms being so directed that the relative distance between the two friction members is smaller than the distance which separates the two pivoting axes, there is at least one elastic member which tends to move the friction members away from one another, and an articulated device connects the two arms in order to make them oscillate with substantially the same amplitude and in opposite directions.

The invention will now be described in greater detail with reference to a method of embodiment which is given by way of example and illustrated in the drawings.

Figure 1 is a perspective view of an appliance according to the invention.

Figure 2 is an elevation of the said appliance in operation.

Figure 3 is a section through the appliance in a plane perpendicular to the pivot pins of the two arms.

The appliance illustrated in the drawings comprises a casing 1. This casing is equipped with two parallel pivot pins 2 and 3. An arm 4 or 5 pivots on each of the pivot pins 2 and 3.

Each arm may consist simply of a metal strip which is rolled up at one end to surround the corresponding pivot pin 2 or 3.

Each arm furthermore carries a friction member 6 or 7 at one end.

In the method of embodiment illustrated in the drawings, a friction member consists of a body 8 comprising a recess which receives the end 9 of the corresponding arm. The body 8 is equipped with fingers 10. The body 8 and the fingers 10 may be made of an elastic material, for example rubber.

As may be clearly seen from Figure 3, the distance between the friction members 6 and 7 is smaller than the distance which separates the pins 2 and 3.

A spring 11 consisting of an elastic strip is attached to the arms 4 and 5. One end of the spring is, for example, riveted to the arm 4 at a point 12, and the other end is riveted to the arm 5 at a point 13. The spring 11 is thus bent inside the casing, and tends to expand, that is to say to move the friction members 6 and 7 away from one another.

The edges 14 and 15 of the casing 1 limit the stroke of the arms 4 and 5, keeping the maximum distance between the friction members 6 and 7 smaller than the distance which separates the pins 2 and 3.

Finally, there is an articulated device to connect the two arms 4 and 5, and to make them oscillate with substantially the same amplitude and in opposite directions.

In the method of embodiment illustrated, the articulated device consists of two links 16 and 17 which are articulated to one another by a pin 18. The link 16 is attached to the arm 4, and the link 17 is attached to the arm 5.

In the appliance illustrated in Figure 3, the combination consisting of the arm 4 and the link 16 oscillates after the manner of a single solid body about the pin 2. Likewise, the combination consisting of the arm 5 and the link 17 oscillates about the pin 3. For the arms 4 and 5 to be able to oscillate effectively in spite of the connection between the links 16 and 17 formed by the articulating pin 18, the said articulating pin 18 must be able to move slightly with respect to the links 16 and 17. To this end, each of the links 16 and 17 is pierced with an elongated aperture, 19 in the case of the link 16, and 20 in the case of the link 17, the articulating pin being capable of free movement in these apertures.

The aperture 19 is in a direction substantially perpendicular to the length of the link 16, and the aperture 20 is likewise in a direction substantially perpendicular to the length of the link 17.

It should be noted that the apertures could be replaced by orifices wherein the articulating pin 18 could move with play.

The appliance which has just been described operates as illustrated especially in Figure 2. Figure 3 shows two possible positions for the arms equipped with friction members, one of the positions being illustrated in full line, and the other in broken line.

To make the appliance work, the friction members 6 and 7 are placed in contact with the cuticle 21, and the appliance is subjected to pressure in the direction indicated by the arrow 20. The arms 4 and 5 then pivot on their pins 2 and 3, stretching the spring 11. The friction members 6 and 7 bear against the cuticle 21, and pinch it as illustrated in Figure 2. The appliance thus allows of two combined actions, on the one hand massage and on the other pinching the cuticle.

When pressure on the appliance is relaxed, the spring 11 expands, and moves the friction members 6 and 7 away from one another.

The appliance which has just been described allows of rapid treatment by massage and pinching the cuticle, the said treatment being carried out without external assistance, even on the rear part of the head. Furthermore, the appliance ensures efficacious treatment without any incorrect operations, since there is no fear of unsatisfactory massage because massage is always accompanied by loosening of the cuticle.

The invention is naturally not limited to the details of the method of embodiment which has just been described, the said details being capable of modification without departing from the scope of the invention.

What I claim is:

1. In a massage device, a hollow crescent-shaped base adapted to fit the hand, an arm pivotally mounted at one extremity in one end of and extending from said base, a second arm pivotally mounted at one extremity in the other end of and extending from said base, the pivots of said arms being parallel and spaced apart further than the other and outer extremities of said arms, a friction member mounted on the outer extremity of each arm, a link fixed to and extending at approximately a right angle from the approximate middle of said first arm into said base, a second link fixed to and extending at approximately a right angle from the approximate middle of said second arm into said base, pivot means connecting said links where they cross in said base and an arcuate-shaped spring in said base engaging each of said arms urging said arms apart about their respective pivots.

2. In a massage device, a hollow elongated base adapted to fit the hand, a pivot in and at one extremity of said base, an arm mounted on said pivot in and extending from said base, a second pivot in and at the other extremity of said base, a second arm mounted on said second pivot in and extending from said base, said pivots being parallel and spaced apart further than the outer extremities of said arms, a friction member on the outer extremity of each of said arms, a link fixed to the first of said arms extending within said base, a second link fixed to the second of said arms extending within said base and crossing said first link, pivot means connecting said links where they cross, and resilient means in said base urging said arms apart about their respective pivots.

3. A massage device as described in claim 2, said resilient means comprising an arcuate-shaped spring extending between said arms.

4. In a massage device, a hollow crescent-shaped base open between the points of the crescent, a massage arm pivotally mounted in and extending from said base and normally engaging one point of the crescent, a second massage arm pivotally mounted in and extending from said base and normally engaging the other point of the crescent, resilient means in said base urging said arms into engagement with their respective crescent point, a link fixed to the first of said arms in and extending into said base, a second link fixed to the other of said arms in and extending into said base and crossing said first link, and pivot means connecting said links where they cross.

References Cited in the file of this patent

UNITED STATES PATENTS

| 1,612,899 | Ahlgren | Jan. 4, 1927 |

FOREIGN PATENTS

| 4,175 | Great Britain | 1914 |